May 12, 1931.  A. D. PENTZ  1,805,256
HYDRAULIC BRAKE
Filed May 26, 1927   2 Sheets-Sheet 1

May 12, 1931.  A. D. PENTZ  1,805,256
HYDRAULIC BRAKE
Filed May 26, 1927   2 Sheets-Sheet 2

Inventor
A. D. Pentz
By his Attorneys
Cooper, Kerr & Dunham

Patented May 12, 1931

1,805,256

UNITED STATES PATENT OFFICE

ALBERT D. PENTZ, OF NEW YORK, N. Y., ASSIGNOR TO PENTZ MOTOR BRAKE CORPORATION, OF NEW YORK, N. Y., A CORPORATION OF NEW YORK

HYDRAULIC BRAKE

Application filed May 26, 1927. Serial No. 194,272.

This invention pertains to hydraulic brakes, especially adaptable for automobile use.

In general, the object of the invention is to provide a hydraulic brake that will be simple, equally efficient in both directions, dustproof, readily adjustable, cheap to manufacture, easy to keep in repair, free from levers and operating joints that are subject to rapid wear, and hermetically sealed to prevent leakage of fluid, whether it be oil or water.

Further and other advantages will be hereinafter set forth in the accompanying specification and claims, and shown in the drawings, which by way of illustration show what is now considered to be the preferred embodiment of the invention.

10 represents the front wheel of an automobile with a brake drum 12 attached thereto. Inside the drum are two substantially semicircular brake shoes 14 and 16. As shown, 14 is the upper shoe and 16 the lower. It is not necessary that the shoes be placed one above the other, because my apparatus will work in any position, for instance with the shoes in fore and aft positions relatively to each other.

Although the drawings show only the front wheel, it will be understood that the invention is adapted for rear as well as for front wheels.

Figure 2:
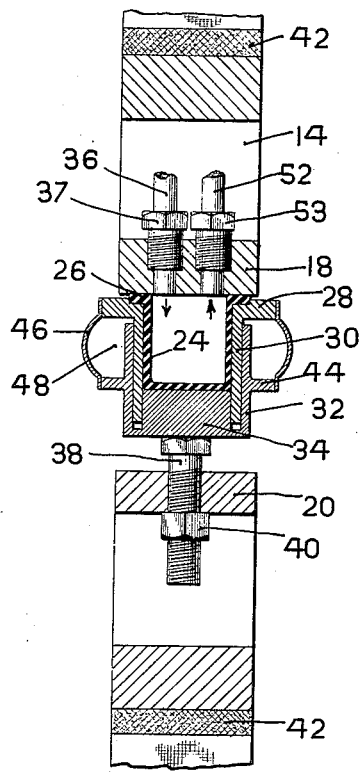
Fig. 2 is a cross-section on the line 2—2 of Fig. 1.

The ends of each shoe 14 and 16 are provided with integral, inwardly turned abutments 18 and 20 respectively. Abutments 18 are parallel to abutments 20. To each abutment 18 is fast an hermetically sealed hydraulic cylinder designated generally as 22, of the type described in detail in my copending application Serial No. 113,131, filed June 2, 1926. The design may best be understood from Fig. 2, in which the hat-shaped rubber member 24 is clamped at its rim 26 against the lower surface of 18 by means of flange 28 which is part of open-end cylinder 30 surrounding rubber member 24. Slidably mounted on the outside of cylinder 30 is a cylinder 32, provided with a plug-like head 34 extending into the open end of cylinder 30 to contact with the closed end of rubber member 24, which is filled with oil.

When additional oil is forced through pipe 36 into member 24, member 24 expands axially within cylinder 30, forcing plug 34 downwardly against screw 38, adjustably set into lower abutment 20 and locked therein by nut 40.

Pipe 36 is supported by bushings 37 tapped into abutments 18.

The above action forces the brake shoes 14 and 16 apart and presses them into contact with the brake drum 12. If desired the brake shoes may be shod with so-called brake lining 42.

Extending from outer cylinder 32 is a circumferential flange 44, preferably of the same diameter as flange 28. Extending from flange 28 to flange 44 is a rubber or otherwise expansible sleeve 46. The space 48 enclosed by sleeve 46 is filled with grease, which finds its way between the surfaces of cylinders 30 and 32 to lubricate all working parts of the cylinder assembly, including the expansible member 24, being forced back and forth between the parts by the movement of sleeve 46 during operation of the brake. At the same time sleeve 46 also serves to exclude all dirt from the working parts of the cylinder.

Figure 1:
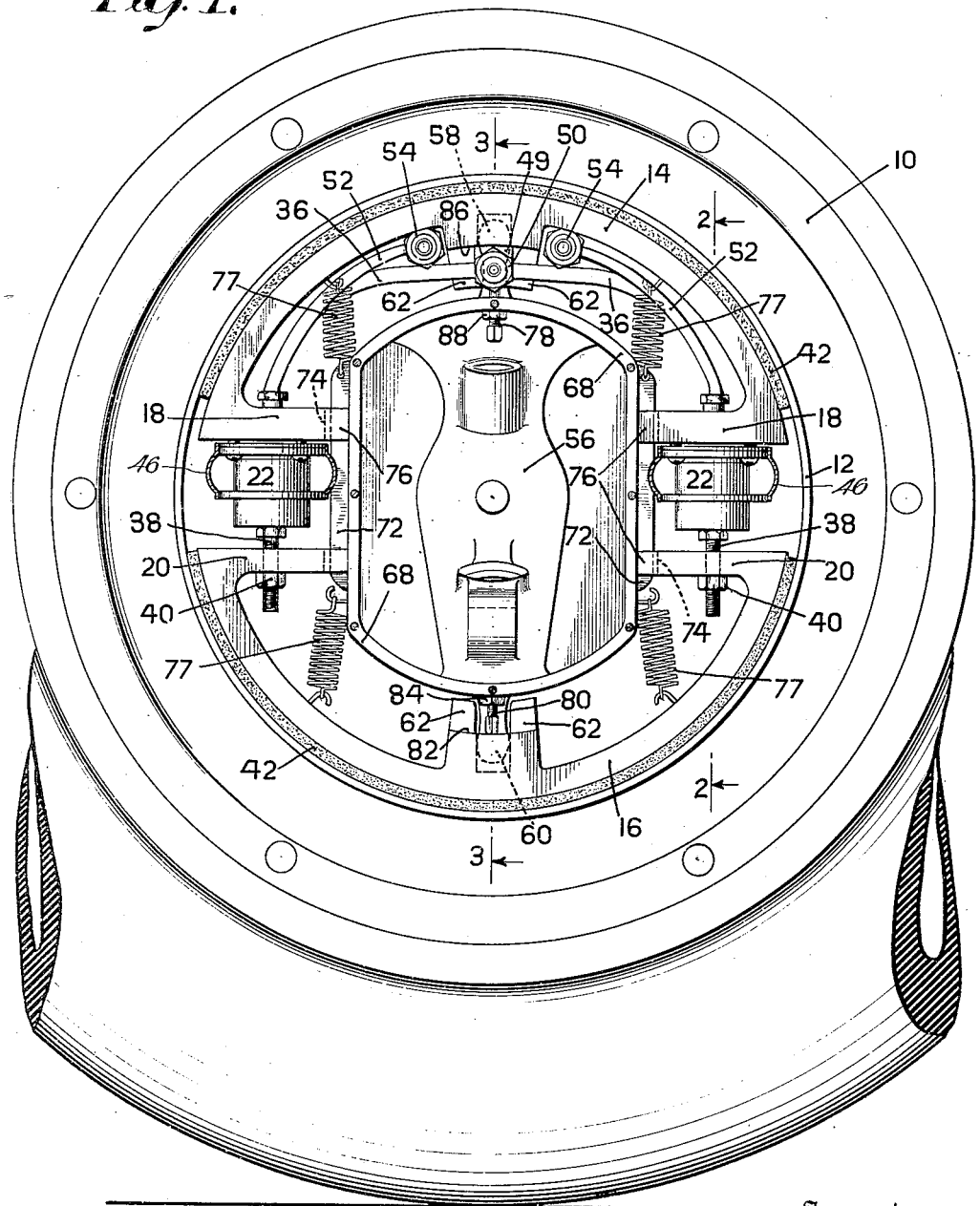
Fig. 1 is a side view of the device.

Conduits 36 run to a fitting 49 provided with a coupling 50 (Figs. 1 and 3) to which is coupled a hose 51 or other conduit connected to the hydraulic system of the car.

Bleeder pipes 52 are provided for removing any air entrapped in the hydraulic system. Each pipe 52 is connected to the highest point of a cylinder through a bushing 53 tapped into abutment 18.

The free ends of the bleeder pipes are located at some convenient point above the cylinders, and are normally closed by caps 54 which may be removed or at least loosened for bleeding purposes.

To prevent the brake shoes turning with the brake drums the following arrangement is provided. Attached to steering knuckle 56 are upwardly and downward extending lugs 58 and 60.

Each of these lugs is engaged on both sides by ears 62 extending inwardly from shoes 14 and 16, thereby preventing the brake shoes from rotating relatively to the steering knuckle.

Figure 3:
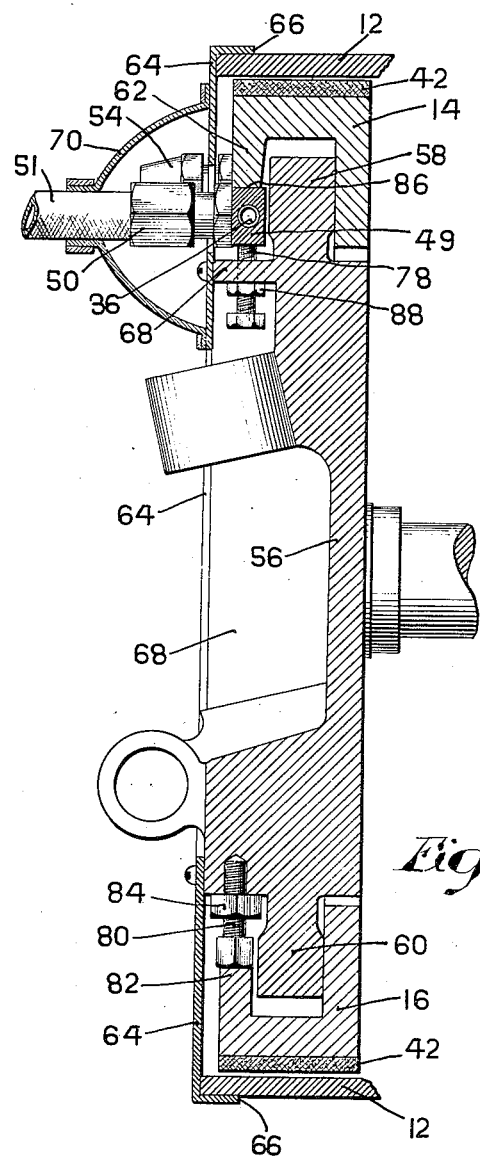
Fig. 3 is a cross-section on the line 3—3 of Fig. 1.

For the purpose of excluding dirt and dust from the parts described above, a sheet metal plate or shield 64 is provided (Fig. 3). The outer rim of 64 is crimped around brake drum 12, as at 66, and the inner rim is attached by screws, to a flange 68 fast to and surrounding the steering knuckle 56. The space between the brake drum and flange 68 is thus completely enclosed. Clearance holes are provided in plate 64 to accommodate connections to the oil supply pipes and bleeder pipes. A flexible boot 70 attached to plate 64 surrounds the hole provided for the oil supply pipe and tightly engages oil supply pipe 51 to exclude dirt, water, etc., from the interior of the brake housing. Boot 70 may cover the bleeder openings also. The sides of flange 68 are straight and vertical, and are provided on their outer surfaces with vertical ribs 72 which serve to guide the brake shoes 14 and 16, abutments 18 and 20 being slotted as at 74 to engage rib 72 for that purpose. The inner ends of the abutments slidably contact with flange 68 at 76 to guide the brake shoes for vertical movement and to prevent the brake shoes from rocking or pivoting about lugs 58—60.

To retract shoes 14 and 16 when pressure is released, four coil springs 77 are used, each spring being anchored at its end to a fixed part of the apparatus as for instance flange 68, and at its outer end to a brake shoe. Screws 38 serve as adjustable stops to limit the inward travel of the shoes in response to the springs.

As the brake shoes wear, or when new linings are applied to the shoes, proper adjustment is made by means of screws 78 and 80 threaded vertically into flange 68 at points adjacent lugs 58 and 60. The head of screw 80 abuts directly against face 82 on brake shoe 16 and is held in adjusted position by lock nut 84. The point of screw 78 abuts against fitting 49 which in turn abuts against face 86 of shoe 14, therefore the same effect is obtained when screw 78 is turned, as if the screw were in direct contact with the brake shoe. Screw 78 is locked by nut 88.

After screws 78 and 80 are set, screws 38 are adjusted to correspond.

Both cylinders are connected by pipes 36 to the same source of supply, therefore when the brake is applied there is an equalizing effect produced between both ends of each shoe as well as between the two shoes themselves. This results in uniformity of pressure between shoe and drum at all four quarters of the drum.

It is to be understood that the invention is not limited to the specific construction herein illustrated and described but can be embodied in other forms without departure from its spirit, as defined by the appended claims.

I claim—

1. In a brake for vehicles, in combination, a brake drum, two semicircular brake shoes oppositely disposed within said drum, and a pair of hydraulic thrust devices between said shoes for forcing them apart and into contact with said drum, said devices being fast to one of said shoes and arranged to thrust directly against the other of said shoes so that the reaction on one shoe will be equal to the thrust on the other shoe.

2. A hydraulic brake for vehicles, comprising in combination, a brake drum, a pair of semicircular brake shoes oppositely disposed within said drum, means for guiding said shoes for straight-line motion, a pair of hydraulic cylinder assemblies each having a cylinder and a part movable relatively to said cylinder, and means for admitting fluid under pressure into said cylinders, said assemblies being arranged so that when the fluid is admitted to the cylinders said movable parts thrust directly against one shoe and the reactions to said thrusts are transmitted by said cylinders directly to the other of said shoes.

3. A hydraulic brake comprising, in combination, a brake drum, a pair of semicircular brake shoes oppositely disposed within said drum, a pair of hydraulic cylinder assemblies each having a cylinder and a member movable relatively thereto, and means for admitting fluid under pressure to said cylinder to move said member, said assemblies being so arranged that when the fluid is admitted said members thrust directly against one shoe and the cylinders react with straight-line movement against the other shoe whereby both assemblies cooperate to impart opposite straight-line movement to both shoes.

4. A hydraulic brake for vehicles comprising in combination, a brake drum, two arcuate brake shoes each supported for independent and unitary straight-line outward and inward movement with respect to the other shoe, and a plurality of hydraulic cylinder assemblies disposed between and entirely supported by said brake shoes and adapted to impart straight-line motion to said shoes by relative movement of the component parts of said assemblies.

5. A hydraulic brake for vehicles comprising in combination, a brake drum, two arcuate brake shoes, a pair of hydraulic cylinders arranged to force said shoes into contact with said drum, and a conduit for supplying fluid to said cylinders, said cylinders and said conduit being fixed to and supported by one of said shoes.

6. The invention set forth in claim 5 in which a pipe for bleeding said cylinders is provided, said pipe being fixed to and supported by the shoe on which said cylinders and conduit are supported.

7. In a brake for vehicles, in combination, a brake drum, two semicircular brake shoes oppositely disposed within said drum, a pair of hydraulic thrust devices between said shoes for forcing them apart and into contact with said drum, said devices being fast to one of said shoes and arranged to thrust against the second of said shoes to press them into contact with said drum, and settable means intermediate said second shoe and said device for adjusting the distance therebetween.

8. A hydraulic brake for vehicles, comprising in combination, a brake drum, a pair of semicircular brake shoes oppositely disposed within said drum, a hydraulic cylinder and plunger device intermediate said shoes for forcing them into engagement with said drum, said cylinder being fast to one of said shoes and said plunger operating against the second of said shoes through a settable device whereby the distance between said plunger and said second shoe may be adjusted.

In testimony whereof I hereto affix my signature.

ALBERT D. PENTZ.